United States Patent [19]

Iwata

[11] Patent Number: 4,691,278
[45] Date of Patent: Sep. 1, 1987

[54] DATA PROCESSOR EXECUTING MICROPROGRAMS ACCORDING TO A PLURALITY OF SYSTEM ARCHITECTURES

[75] Inventor: Jun Iwata, Tokyo, Japan

[73] Assignee: NEC Corporation, Tokyo, Japan

[21] Appl. No.: 726,440

[22] Filed: Apr. 23, 1985

[30] Foreign Application Priority Data

Apr. 23, 1984 [JP] Japan .................................. 59-81585
May 25, 1984 [JP] Japan .................................. 59-106120

[51] Int. Cl.⁴ .............................................. G06F 9/22
[52] U.S. Cl. .................................................. 364/200
[58] Field of Search ......................... 364/200 MS File

[56] References Cited

U.S. PATENT DOCUMENTS 4,077,058  2/1978  Appell et al. ....................... 364/200
4,205,371  5/1980  Feather .............................. 364/200
4,456,954  6/1984  Bullions, III et al. .............. 364/200
4,467,409  8/1984  Potash et al. ....................... 364/200

Primary Examiner—Thomas M. Heckler
Attorney, Agent, or Firm—Sughrue, Mion, Zinn, Macpeak, and Seas

[57] ABSTRACT

A data processor controlled by microprograms which can run a desired program in a selected one of multiple system architectural modes. In the data processor, the operation code of the instruction is used as an address for a decoding information storage which stores a plurality of pairs of a microinstruction start address and an editing format control word. A selector selects a pair of a start microinstruction address and an editing format control word. The microinstruction start address is used for accessing a microcode control storage storing a plurality of microprograms in microinstruction form. The editing format control is used as an editing designation signal for editing the operand of the instruction according to the selected mode.

4 Claims, 12 Drawing Figures

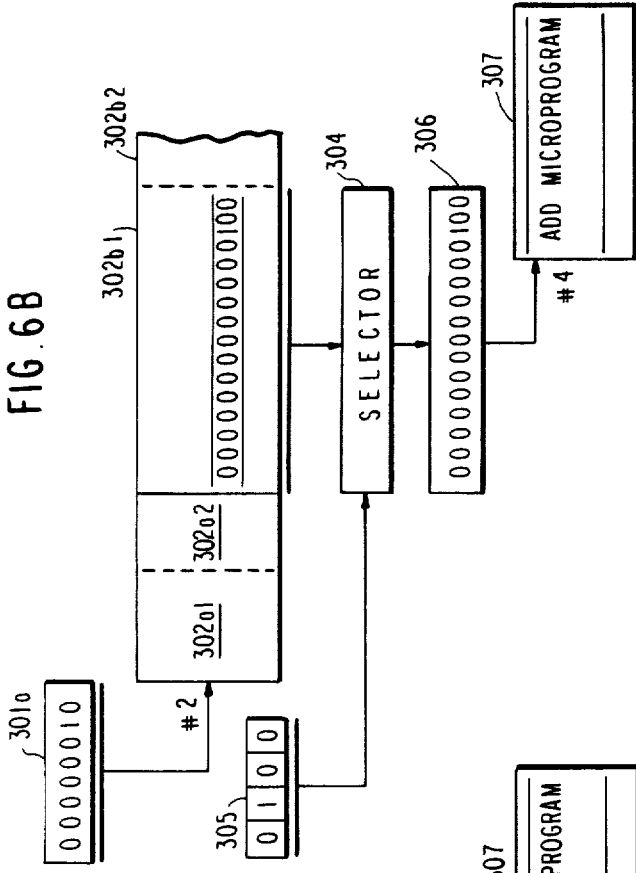
FIG. 6A
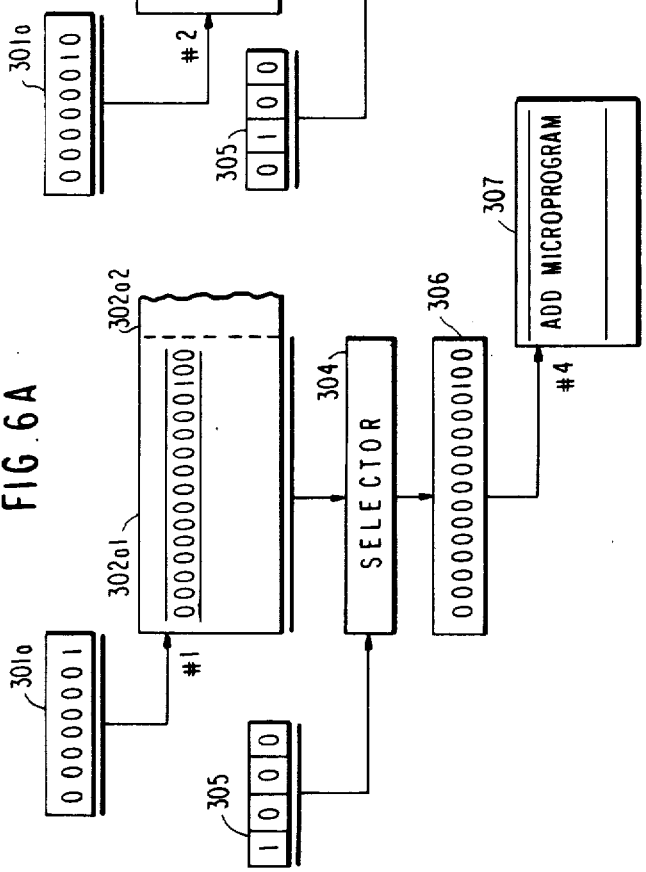
FIG. 6B
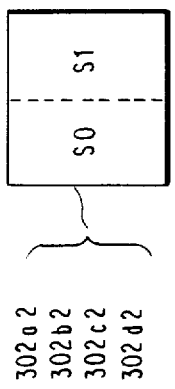
FIG. 7
FIG. 8
| EDITING FORMAT | S1 | S0 |
|---|---|---|
| MODE A FORMAT | 0 | 0 |
| MODE B FORMAT | 1 | 0 |
| MODE C FORMAT | 0 | 1 |
| MODE D FORMAT | 1 | 1 |

DATA PROCESSOR EXECUTING MICROPROGRAMS ACCORDING TO A PLURALITY OF SYSTEM ARCHITECTURES

BACKGROUND OF THE INVENTION

The invention relates to a data processor controlled by microprograms which operate according to a selected one of a plurality of architectural modes.

Conventional data processors operate under only one hardware architecture and only one operating system.

One prior art technique accomplishes a virtual machine (VM) system, which allows different operating systems to run on a given hardware architecture. Bullions, III et al. in U.S. Pat. No. 4,456,954 describe an example of controlling a VM system so that each operating system can operate the data processor. In this VM system, since a plurality of software-defined operating systems use a common set of microprograms in microcode, each of the multiple operating systems can not run at their optimal efficiency since different microprogram sets excel in different areas.

SUMMARY OF THE INVENTION

It is therefore one object of the present invention to provide a data processor in which a program, written in any of a number of system architectures, can run at its optimal speed.

Another object of the present invention is to provide a data processor which decreases the number of microinstruction steps so that the size of the control storage for storing the microprograms is reduced.

According to one feature of the present invention, there is provided a data processor comprising a control storage unit for storing a plurality of the microprograms, each of which comprises a series of microinstructions. Each of the microprograms corresponds to an instruction code in one or more of a plurality of system architectures.

A decoding information storage unit stores a plurality of microinstruction start addresses of the microprograms. The start addresses are designated by the operation code of the instruction and may differ according to the selected system architecture. A mode register designates one of a plurality of system architectures in response to a microinstruction from the storage control unit. A selector selects one start microinstruction address from the plurality of microinstruction start addresses in the decoding information storage in response to the architecture selected by the mode register, and puts the address in a microcode control storage.

An accessing unit accesses the microcode control storage according to the microinstruction start address from the selector.

BRIEF DESCRIPTION OF THE DRAWINGS

FIGS. 6A and 6B are diagrams for explaining the addressing of the microcode control storage under mode A and mode B, respectively;

FIG. 7 illustrates the format of the editing control sub-word of FIG. 4;

FIG. 8 is a table explaining the relationship between the editing control sub-words and the formats of each of four instruction types A to D;

DESCRIPTION OF THE PREFERRED EMBODIMENT

Figure 1:
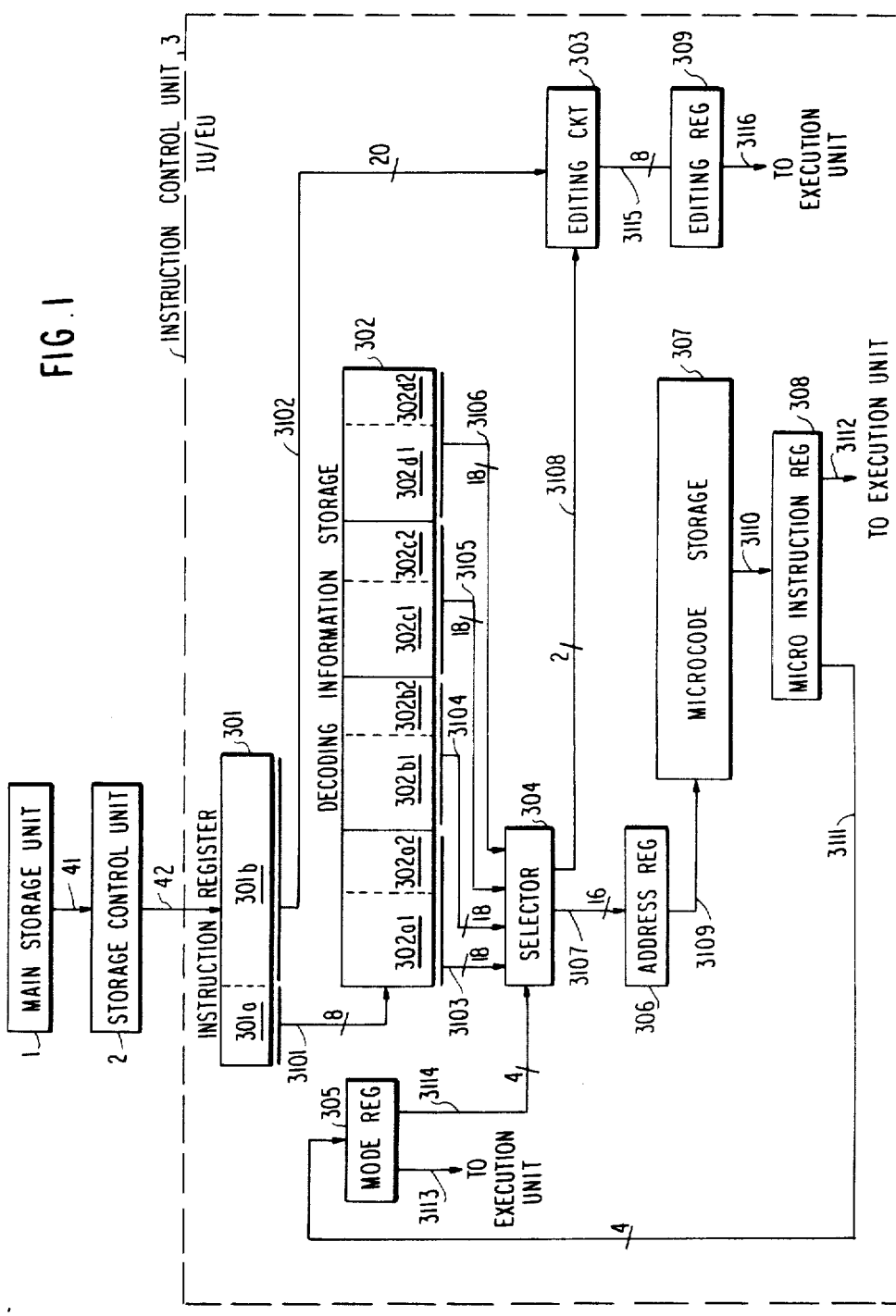
FIG. 1 is a block diagram of the instruction control unit with a main memory unit and a storage control unit.

Referring to FIG. 1, a data processor according to the present invention includes a main storage unit 1, a storage control unit 2, and an instruction control unit 3.

Figure 2:
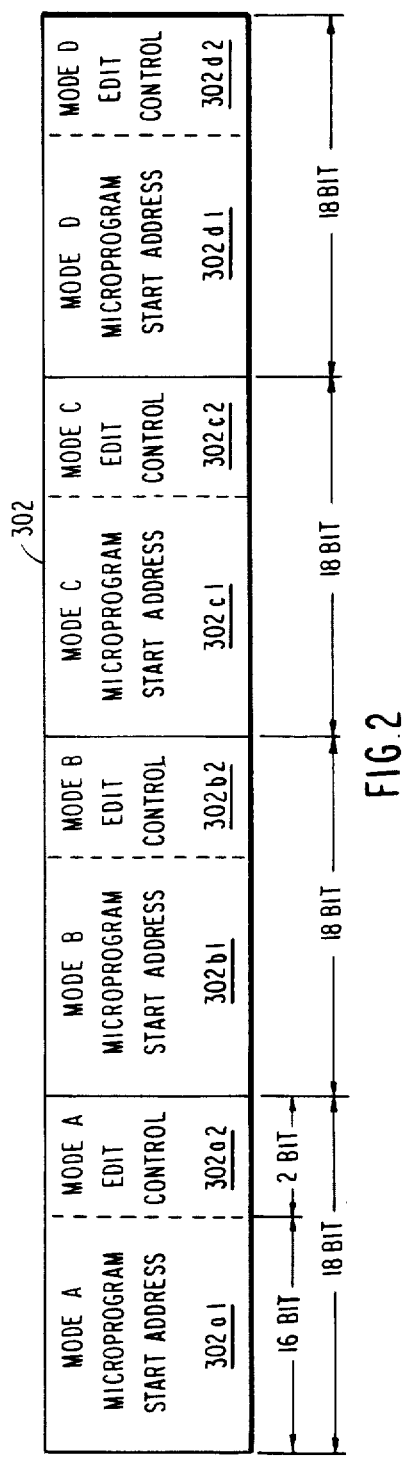
FIG. 2 is an illustration of the format of the contents in the decoding information storage of FIG. 1.

The instruction from the main storage unit 1 is written into an instruction register 301 in the instruction control unit 3 via the storage control unit 2 and intermediate lines 41 and 42. The instruction stored in the instruction register 301 has an operation code 301a and an operand 301b. The operand 301b is a special case of an instruction descriptor which affects the result of an operation defined by the operation code 301a without determining the microcode necessary for that operation. For example, in the illustrated embodiment, the operation code 301a and the operand 301b have 8 bits and 20 bits, respectively. In general, the operation code 301a defines the type of operation that is executed when the instruction is encountered. In the illustrated embodiment, the operation code 301a is used as addressing information for decoding information storage 302. The use of operation codes to address a memory containing microinstructions is disclosed by Enger et al. in U.S. Pat. No. 3,800,293. The decoding information storage 302 stores a plurality of pairs of information, for example four pairs, of microinstruction start addresses 302a1, 302b1, 302c1, and 302d1, and paired editing control sub-words 302a2, 302b2, 302c2, and 302d2. An example of the start addresses and the paired editing control sub-words is illustrated in FIG. 2. The pair of the start address 302a1 and the editing control sub-word 302a2 corresponds to an instruction of system architecture A. In the same manner, the pair of the start address 302b1 and the editing control sub-word 302b2, the pair of the start address 302c1 and the editing control sub-word 302c2, and the pair of the start address 302d1 and the editing control sub-word 302d2 correspond to instructions of system architectures B, C, and D, respectively. For example, each of the microinstruction start addresses 302a1, 302b1, 302c1 and 302d1 has eighteen bits, and each of the editing control sub-words 302a2, 302b2, 302c2, and 302d2 has two bits. As the operation code used for addressing the decoding information storage 302 has eight bits, the size of the storage 302 is 256 ($=2^8$) words for each of the four architectural modes with each word being a paired microinstruction start address and an editing control sub-word.

One of the microinstruction start addresses 302a1, 302b1, 302c1 and 302d1 is selected by a selector 304 and is used to access a microcode storage 307 via an address register 306. The microinstruction start addresses 302a1, 302b1, 302c1 and 302d1 are used as address information to access the microcode storage 307 which contains all the microinstructions as initially addressed by the address register 306. The microcoded microinstructions are sequentially read from the microinstruction register 308 to the execution unit (not illustrated).

On the other hand, one of the editing control information words 302a2, 302b2, 302c2, or 302d2 corresponding to the start address 302a1, 302b1, 302c1, or 302d1 is selected by the selector 304 and given to an editing circuit 303. The control information sub-words 302a2, 302b2, 302c2 and 302d2, as will be described later in detail, are used as an editing select signal to selectors X0–X7 in the editing circuit 303 to control editing of the operand 301b.

Figure 4:
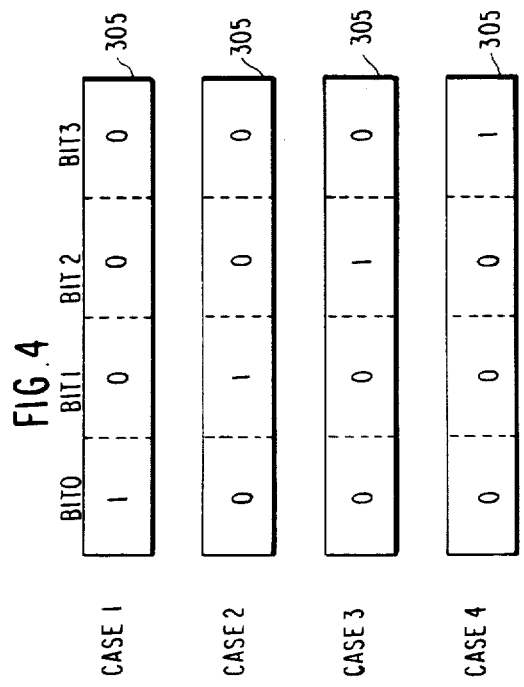
FIGS. 3 and 4 are illustrations of the formats of the contents in the mode register of FIG. 1.
Figure 3:
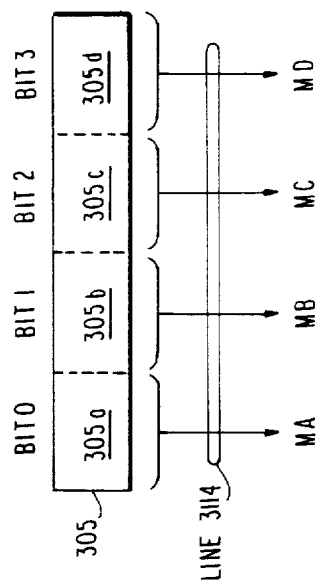

A mode select signal to the selector 304 will now be explained. The mode select signal on the line 3114 has four bits. Referring to FIGS. 3 and 4, the mode select signal is stored in a mode register 305. When the 0-bit 305a is a logical "1" and the other bits 305b to 305d are logical "0" (case 1 in FIG. 4), the mode register 305 designates architecture A. When the 1-bit 305b is logical "1" and the other bits 305a, 305c and 305d are logical "0" (case 2 in FIG. 4), the mode register 305 designates architecture B. Similarly, when the 2-bit 305c is logical "1" and the other bits 305a, 305b and 305d are logical "0" (case 3 in FIG. 4), the mode designates architecture C. Likewise, when the 3-bit 305d is logical "1" and the other bits 305a, 305b and 305c are logical "0" (case 4 in FIG. 4), the mode register 305 designates architecture D.

Figure 5:
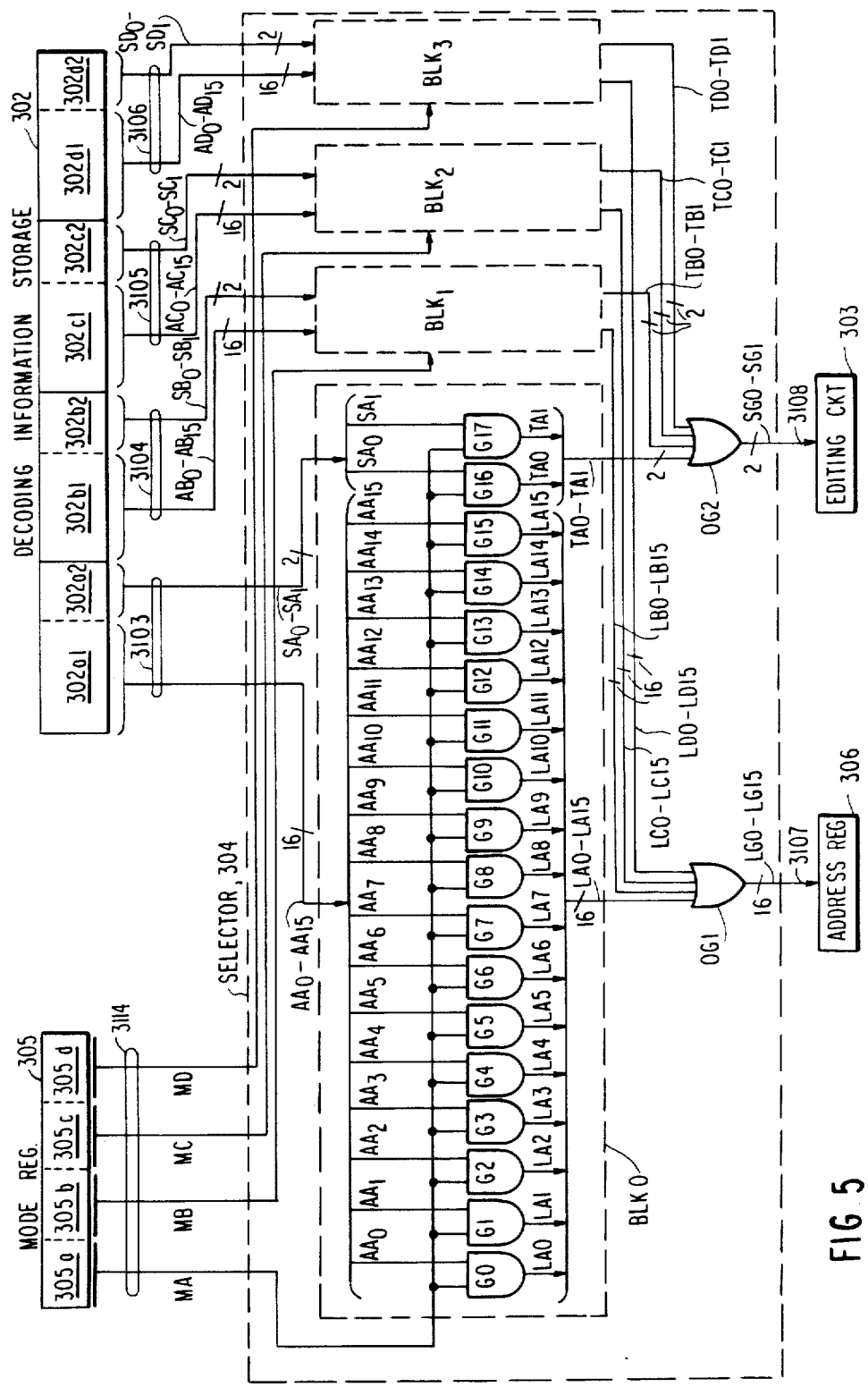
FIG. 5 is a detailed schematic diagram of the selector, the mode register, the microcode address, the address register, and the editing circuit of FIG. 1.

An example of the selector 304 is illustrated in FIG. 5. Mode select signals MA, MB, MC and MD, corresponding to the four bits 305a–305d in mode register 305, indicate the architecture modes A, B, C and D, respectively. Start addressing signals $AA_0$–$AA_{15}$, $AB_0$–$AB_{15}$, $AC_0$–$AC_{15}$, and $AD_0$–$AD_{15}$ respectively represent the microinstruction start addresses 302a1, 302b1, 302c1 and 302d1 in the decoding information storage 302. The mode signal MA and the start address signals $AA_0$–$AA_{15}$ are logically multiplied in AND gates G0 to G15. Editing control signals $SA_0$, $SA_1$, $SB_0$, $SB_1$, $SC_0$, $SC_1$, $SD_0$, and $SD_1$, represent the respective editing control sub-words 302a2, 302b2, 302c2 and 302d2 from the decoding information storage 302. The mode signal MA and the editing control signals $SA_0$ and $SA_1$ are logically multiplied in AND gates G16 and G17. A sub-block $BLK_O$ comprises AND gates G0 to G17. Outputs $LA_0$ to $LA_{15}$ and $TA_0$ and $TA_1$ of the AND gates G0 to G17 are represented by the following Boolean expressions:

$LA_0 = AA_0.MA$, $LA_1 = AA_1.MA$, $LA_2 = AA_2.MA$, $LA_3 = AA_3.MA$, $LA_4 = AA_4.MA$, $LA_5 = AA_5.MA$, $LA_6 = AA_6.MA$, $LA_7 = AA_7.MA$, $LA_8 = AA_8.MA$, $LA_9 = AA_9.MA$, $LA_{10} = AA_{10}.MA$, $LA_{11} = AA_{11}.MA$, $LA_{12} = AA_{12}.MA$, $LA_{13} = AA_{13}.MA$, $LA_{14} = AA_{14}.MA$, $LA_{15} = AA_{15}.MA$, $TA_0 = SA_0.MA$, and $TA_1 = SA_1.MA$. \hfill (1)

In the same manner, outputs $LB_0$ to $LB_{15}$, $TB_0$ and $TB_1$, of another sub-block $BLK_1$ are represented by the following Boolean equations:

$LB_0 = AB_0.MB$, $LB_1 = AB_1.MB$, $LB_2 = AB_2.MB$, $LB_3 = AB_3.MB$, $LB_4 = AB_4.MB$, $LB_5 = AB_5.MB$, $LB_6 = AB_6.MB$, $LB_7 = AB_7.MB$, $LB_8 = AB_8.MB$, $LB_9 = AB_9.MB$, $LB_{10} = AB_{10}.MB$, $LB_{11} = AB_{11}.MB$, $LB_{12} = AB_{12}.MB$ $LB_{13} = AB_{13}.MB$, $LB_{14} = AB_{14}.MB$, $LB_{15} = AB_{15}.MB$, $TB_0 = SB_0.MB$, and $TB_1 = SB_1.MB$. \hfill (2)

Similarly, the outputs $LC_0$ to $LC_{15}$, $TC_0$ and $TC_1$ of a third sub-block $BLK_2$ are represented by the following Boolean equations:

$LC_0 = AC_0.MC$, $LC_1 = AC_1.MC$, $LC_2 = AC_2.MC$, $LC_3 = AC_3.MC$, $LC_4 = AC_4.MC$, $LC_5 = AC_5.MC$, $LC_6 = AC_6.MC,$ $LC_7 = AC_7.MC,$ $LC_8 = AC_8.MC,$ $LC_9 = AC_9.MC,$ $LC_{10} = AC_{10}.MC,$ $LC_{11} = AC_{11}.MC,$ $LC_{12} = AC_{12}.MC,$ $LC_{13} = AC_{13}.MC,$ $LC_{14} = AC_{14}.MC,$ $LC_{15} = AC_{15}.MC,$ $TC_0 = TC_0.MC,$ and $$TC_1 = TC_1.MC. \quad (3)$$

In the same manner, the outputs $LD_0$ to $LD_{15}$, $TD_0$ and $TD_1$ of a fourth sub-block BLK3 are represented by the following Boolean expressions.

$LD_0 = AD_0.MD,$ $LD_1 = AD_1.MD,$ $LD_2 = AD_2.MD,$ $LD_3 = AD_3.MD,$ $LD_4 = AD_4.MD,$ $LD_5 = AD_5.MD,$ $LD_6 = AD_6.MD,$ $LD_7 = AD_7.MD,$ $LD_8 = AD_8.MD,$ $LD_9 = AD_9.MD,$ $LD_{10} = AD_{10}.MD,$ $LD_{11} = AD_{11}.MD,$ $LD_{12} = AD_{12}.MD,$ $LD_{12} = AD_{12}.MD,$ $LD_{13} = AD_{13}.MD,$ $LD_{14} = AD_{14}.MD,$ $LD_{15} = AD_{15}.MD,$ $TD_0 = SD_0.MD,$ and $$TD_1 = SD_1.MD. \quad (4)$$

The corresponding outputs $LA_0$ to $LA_{15}$, $LB_0$ to $LB_{15}$, $LC_0$ to $LC_{15}$, and $LD_0$ to $LD_{15}$ of the sub-blocks BLK0 to BLK3 are logically summed in a group OG1 of 16 4-input OR gates. The outputs $LG_0$ to $LG_{15}$ of the OR gate group OG1 are represented by the following Boolean equations:

$LG_0 = LA_0 + LB_0 + LC_0 + LD_0,$ $LG_1 = LA_1 + LB_1 + LC_2 + LD_1,$ $LG_2 = LA_2 + LB_2 + LC_2 + LD_2,$ $LG_3 = LA_3 + LB_3 + LC_3 + LD_3,$ $LG_4 = LA_4 + LB_4 + LC_4 + LD_4,$ $LG_5 = LA_5 + LB_5 + LC_5 + LD_5,$ $LG_6 = LA_6 + LB_6 + LC_6 + LD_6,$ $LG_7 = LA_7 + LB_7 + LC_7 + LD_7,$ $LG_8 = LA_8 + LB_8 + LC_8 + LD_8,$ $LG_9 = LA_9 + LB_9 + LC_9 + LD_9,$ $LG_{10} = LA_{10} + LB_{10} + LC_{10} + LD_{10},$ $LG_{12} = LA_{12} + LB_{12} + LB_{12} + LD_{12},$ $LG_{13} = LA_{13} + LB_{13} + LB_{13} + LD_{13},$ $LG_{14} = LA_{14} + LB_{14} + LB_{14} + LD_{14},$ and $$LG_{15} = LA_{15} + LB_{15} + LB_{15} + LD_{15}. \quad (5)$$

If the Boolean equations (1) to (4) are substituted into equations (5), the following set of Boolean expressions will be obtained.

$LG_0 = AA_0.MA + AB_0.MB + AC_0.MC + AD_0.MD,$ $LG_1 = AA_1.MA + AB_1.MB + AC_1.MC + AD_1.MD,$ $LG_2 = AA_2.MA + AB_2.MB + AC_2.MC + AD_1.MD,$ $LG_3 = AA_3.MA + AB_3.MB + AC_3.MC + AD_3.MD,$ $LG_4 = AA_4.MA + AB_3.MB + AC_4.MC + AD_4.MD,$ $LG_5 = AA_5.MA + AB_5.MB + AC_5.MC + AD_5.MD,$ $LG_6 = AA_6.MA + AB_6.MB + AC_6.MC + AD_6.MD,$ $LG_7 = AA_7.MA + AB_7.MB + AC_7.MC + AD_7.MD,$ $LG_8 = AA_8.MA + AB_8.MB + AC_8.MC + AD_8.MD,$ $LG_9 = AA_9.MA + AB_9.MB + AC_9.MC + AD_9.MD,$ $LG_{10} = AA_{10}.MA + AB_{10}.MB + AC_{10}.MC + AD_{10}.MD,$ $LG_{11} = AA_{11}.MA + AB_{11}.MB + AC_{11}.MC + AD_{11}.MD,$ $LG_{12} = AA_{12}.MA + AB_{12}.MB + AC_{12}.MC + AD_{12}.MD,$ $LG_{13} = AA_{13}.MA + AB_{13}.MB + AC_{13}.MC + AD_{13}.MD,$ $LG_{14} = AA_{14}.MA + AB_{14}.MB + AC_{14}.MC + AD_{14}.MD,$ and $$LG_{15}=AA_{15}.MA+AB_{15}.MB+AC_{15}.MC+AD_{15}.MD. \quad (6)$$

When the mode A is set, the outputs $LG_0$ to $LG_{15}$ of OR gate group OG1 assume the values of the start addressing signals $AA_0$ to $AA_{15}$. Accordingly only the microinstruction start address 302a1 of the decoding information storage 302 is selected by the OR gate group OG1 when the mode A is set. After the selection, the microinstruction start address 302a1 is given to the microcode storage 307 via the address register 306. Accordingly, the address register 306 stores sixteen bits of addressing signals.

Next, the operation of the same functional instruction represented in two different modes is illustrated in FIGS. 6A and 6B. Referring to FIG. 6A, in the mode A, the operation code of the instruction, for instance an ADD instruction, is represented as "00000001" the operation code. This binary value "00000001" designates the first address #1 of the decoding information storage 302 at address #1. The bit pattern "0000000000000100" is read out from the start address sub-word 301a of the decoding information storage 302 at address #1. As the mode is set to be A, the content of the mode register 305 in this case has been set to "1000". Accordingly, the pattern "0000000000000100" from the start portion 302a1 of the decoding information storage 302 is selected by the selector 304 and is temporarily stored in the address register 306. The pattern from the register 306 designates the address #4 of the microcode storage 307. The starting microinstruction of the microprogram, which controls the ADD function, is stored at the address #4 and following of the microcode control storage 307.

Now referring to FIG. 6B, in the mode B, the operation code of the instruction, corresponding to the ADD function, is assumed to be represented as "00000010". As, in general, the bit pattern of the operation code depends on the system architecture, the pattern of the ADD operation code in the mode A and the pattern of the operation code in mode B may be different. The operation code "00000010" in mode B designates the second address #2 of the decoding information storage 302. The bit pattern "0000000000000100", which is the same as the pattern stored in the first address #1 of start address sub-word 301a for the A mode, is read out from the start address sub-word 302b1 for the B mode of the decoding information storage 302 at address #2. Now, as the mode is B, the content of the mode register 305 has been set to "0100". Accordingly, the pattern "0000000000000100" from the address #2 of the start address sub-word 302b1 for the B mode of the decoding information storage 302 is selected by the selector 304 and is temporarily stored in the address register 306. The pattern from the register 306 in the B mode designates the same address #4 of the microcode control storage 307 as was designated for the same function ADD instruction in the A mode. The microprogram, which controls the ADD function, is stored at the address #4 of the microcode storage 307.

The above description relates to operational functions that are common to both the A mode and B mode. However, one of the modes may include functions not available in the other mode, and vice versa. In this case, a separate microprogram incorporating a non-common function is available only to the mode supporting that non-common function. It is not required that all functions be expressed in operation codes available in one primary mode. Instead, each mode can have its own specialized and efficient microprograms for specialized operation codes while operation codes for common functions are executed by a single microprogram regardless of the mode of the operation code.

The present invention can achieve the result that a desired program can run at the most suitable speed under the different system architectures. Furthermore, by adapting the system illustrated in FIGS. 6A and 6B, the present invention can contribute to the reduction of memory requirements for the microcode storage 307. In the conventional technique, the definition of the operation codes of the instructions in the different operating systems does not consider the relationship of the function of each instruction and therefore each instruction must have a corresponding individual microprogram. On the contrary, the present invention can achieve the common use of the same microprogram corresponding to the instructions, which accomplish the same functional operation. Accordingly, each instruction does not need to have a corresponding individual microprogram.

Although, the ADD operation code in the different architectures may invoke the same microprogram in the microcode storage, the operands 301b may have different formats. Accordingly, operand editing may be necessary.

Referring back to FIG. 5, the edit control outputs $TA_0$, $TA_1$, $TB_0$, $TB_1$, $TC_0$, $TC_1$, $TD_0$, and $TD_1$ are logically summed in a group OG2 of 2 4-input OR gates. Each of the outputs $SG_0$ and $SG_1$ of the OR gate group OG2 is represented by the following Boolean equations:

$$SG_0=TA_0+TB_0+TC_0+TD_0,$$

and $$SG_1=TA_1+TB_1+TC_1+TD_1 \quad (7)$$

If the equations (1) to (4) are substituted into the equations (7), the following Boolean equations (8) are obtained:

$$SG_0=SA_0.MA+SB_0.MB+SC_0.MC+SD_0.MD,$$

and
$$SG_1=SA_1.MA+SB_1.MB+SC_1.MC+SD_1.MD \quad (8)$$

When the mode A is set, the signals $SA_0$ and $SA_1$ are selected by the selector 304. After the selection, the signals $SA_0$ and $SA_1$, which are the editing control sub-words 302a2, are given to an editing circuit 303.

The editing operation will be explained hereafter with reference to FIGS. 7, 8, 9A and 9B. Each of the editing control sub-words 302a2, 302b2, 302c2, and 302d2 has two bits S0 and S1. The bit pattern "0,0" of the bits S0 and S1 designates the format for editing the instruction descriptors or operands of the instruction word, according to a type A instruction. The operands of the type A instruction words (shown in entry item (A) of FIG. 9A) can be edited to the format shown in entry (A) of FIG. 9B by the editing circuit 303 of FIG. 1. The bit pattern "0,1" of the bits S0 and S1 designates the format for editing the operand for B type instructions. The operands of type B instructions (shown in entry (B) of FIG. 9A) can be edited to the format shown in entry (B) of FIG. 9B by the editing circuit 303. The bit pattern "1,0" of the bits $S_0$ and $S_1$ designates the format for editing the operands of the instructions of type C. The operands of the type C instruction word as (shown in the entry (c) of FIG. 9A) can be edited to the format shown in entry (c) of FIG. 9B by the editing circuit 303. The bit pattern "1,1" of the bits $S_0$ and $S_1$ designates the format for editing the operand of the type D instructions. The operand of type D instructions (shown in the entry (D) of FIG. 8A) can be edited to the format shown in the item (D) of FIG. 9B by the editing circuit 303.

Figure 10:
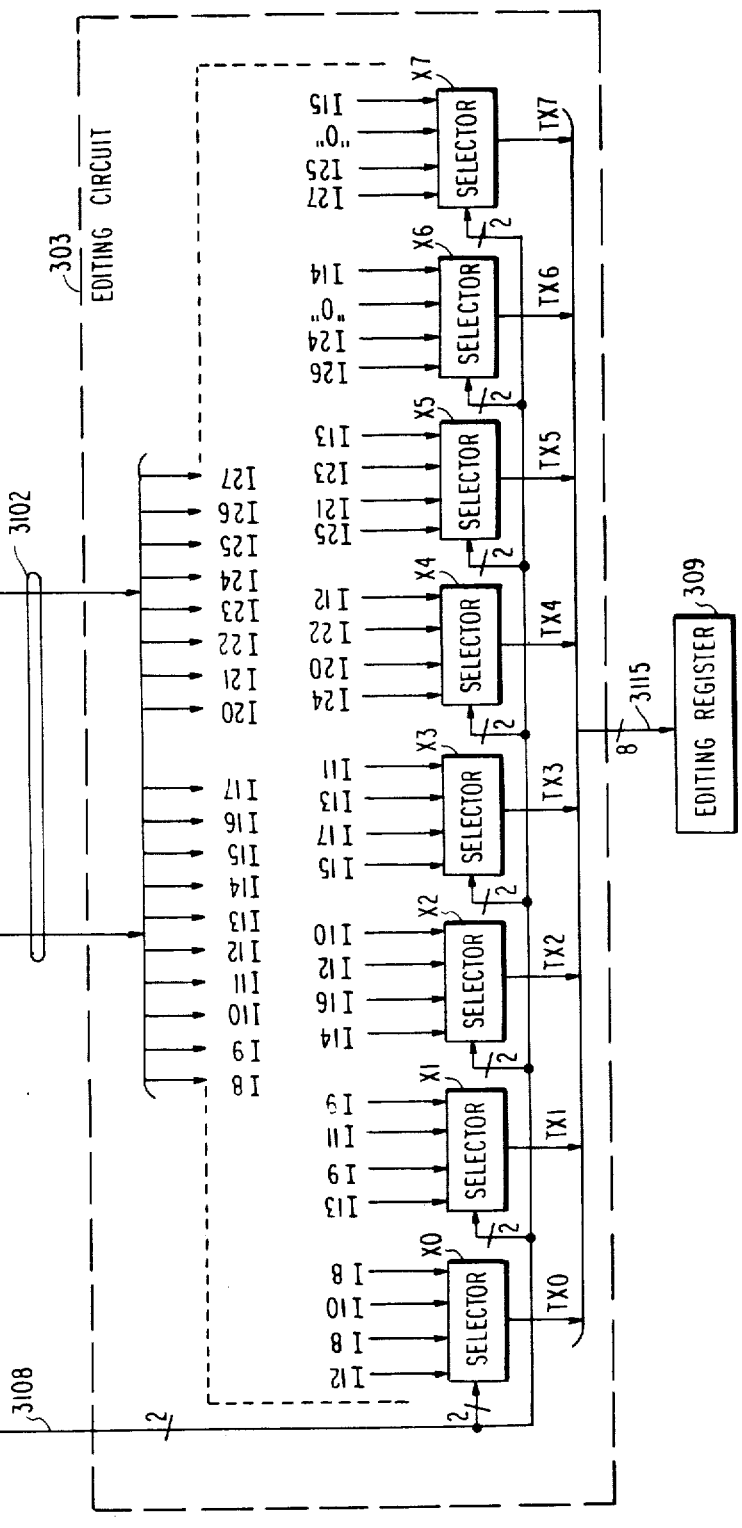
FIG. 10 is a detailed schematic diagram of the editing circuit, the selector, the instruction register, and the editing register.

An example of the editing circuit 303 is illustrated in FIG. 10. The editing circuit 303 includes eight four-way selectors X0 to X7. A plurality of bits in the operand stored in the instruction register 301 are led as inputs I8–I17 and I20–I27 to the selectors X0 to X7. Signals I8 to I17 and I20 to I27 represent the bits 8 to 17 and 20 to 27 of the operand 301b. The bit pattern inclusive of the bits S0 and S1, which is the editing control sub-word, controls the selectors X0 to X7. The outputs TX0 to TX7 of the selectors X0 to X7 can be represented by the following Boolean equations:

$$TX0 = I12 \cdot \overline{S0} \cdot \overline{S1} + I8 \cdot \overline{S0} \cdot S1 + I10 \cdot S0 \cdot \overline{S1} + I8 \cdot S0 \cdot S1,$$

$$TX1 = I13 \cdot \overline{S0} \cdot \overline{S1} + I9 \cdot \overline{S0} \cdot S1 + I11 \cdot S0 \cdot \overline{S1} + I9 \cdot S0 \cdot S1,$$

$$TX2 = I14 \cdot \overline{S0} \cdot \overline{S1} + I16 \cdot \overline{S0} \cdot S1 + I12 \cdot S0 \cdot \overline{S1} + I10 \cdot S0 \cdot S1,$$

$$TX3 = I15 \cdot \overline{S0} \cdot \overline{S1} + I17 \cdot \overline{S0} \cdot S1 + I13 \cdot S0 \cdot \overline{S1} + I11 \cdot S0 \cdot S1,$$

$$TX4 = I24 \cdot \overline{S0} \cdot \overline{S1} + I20 \cdot \overline{S0} \cdot S1 + I22 \cdot S0 \cdot \overline{S1} + I12 \cdot S0 \cdot S1,$$

$$TX5 = I25 \cdot \overline{S0} \cdot \overline{S1} + I21 \cdot \overline{S0} \cdot S1 + I23 \cdot S0 \cdot \overline{S1} + I13 \cdot S0 \cdot S1,$$

$$TX6 = I26 \cdot \overline{S0} \cdot \overline{S1} + I24 \cdot \overline{S0} \cdot S1 + "0" \cdot S0 \cdot \overline{S1} + I14 \cdot S0 \cdot S1,$$

and $$TX7 = I27 \cdot \overline{S0} \cdot \overline{S1} + I25 \cdot \overline{S0} \cdot S1 + "0" \cdot S0 \cdot \overline{S1} + I15 \cdot S0 \cdot S1. \quad (9)$$

In the above equations (9), when the mode A is set, the signals S0 and S1 are "0" and "0". Accordingly, the selectors X0 to X7 select the signals I12 to I15 and I24 to I27, respectively. In the same manner, when the mode B is set, the signals S0 and S1 are "0" and "1". Accordingly, the selectors X0 to X7 select the signals I8 and I9, I16 and I17, I20 and I21, and I24 and I25 respectively. When the mode C is set, the signals S0 and S1 are "1" and "0", so that the selectors X0 to X5 select the signals I10 to I13, I22 and I23. The selectors X6 and X7 both select "0". When the mode D is set, the signals S0 and S1 are "1" and "1". Accordingly, the selectors X0 to X7 select the signals I8 to I15, respectively.

Figure 9B:
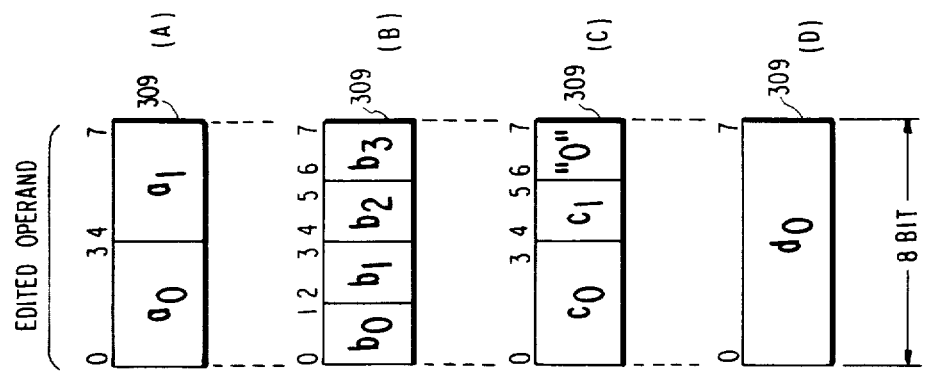
FIG. 9B illustrates the format of the contents in the editing register.
Figure 9A:
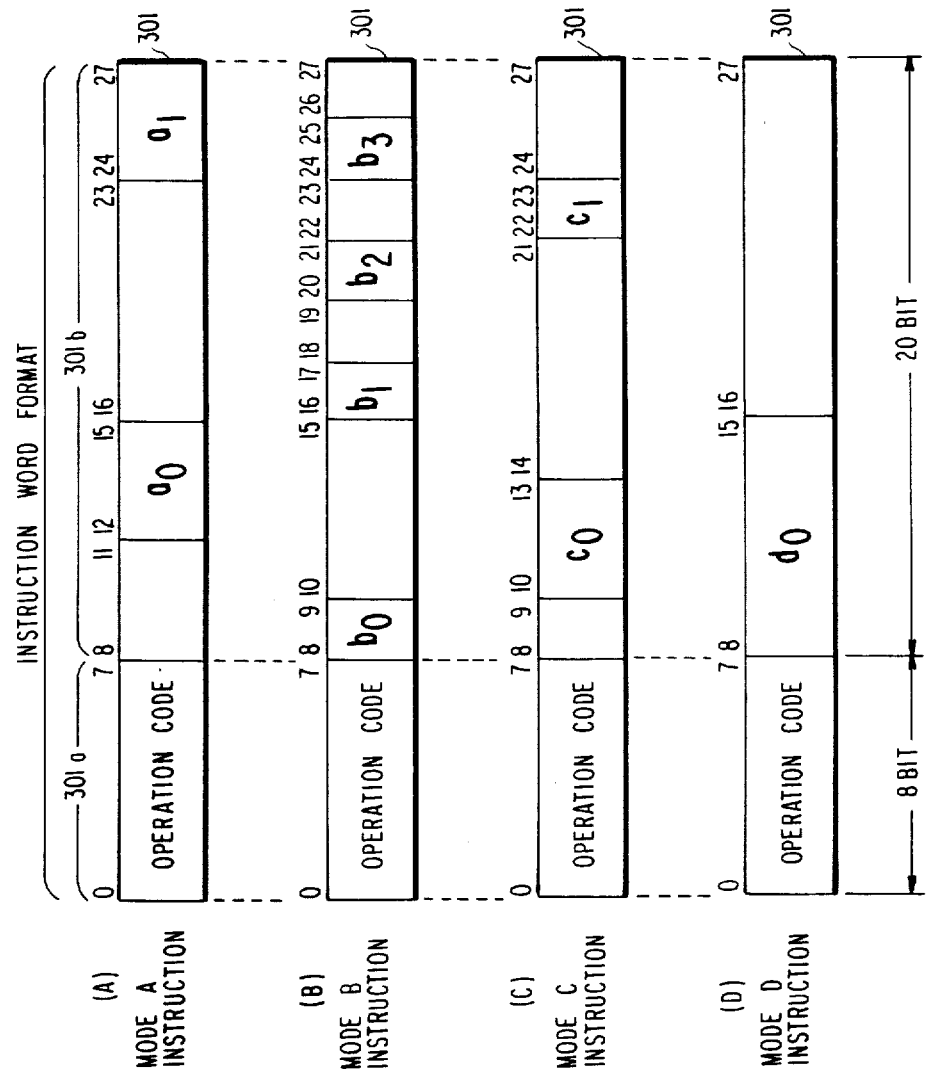
FIG. 9A illustrates the various formats of the input to the editing circuit.

Each of the outputs of the selectors X0 to X7 is identified with the value shown in FIG. 9B. The input of the editing circuit 303 has twenty bits and its output has eight bits. Accordingly, the number of bits to be sent to an execution unit (not shown) are decreased by the editing operation in the editing circuit 303. The microinstruction of the microinstruction register 308 is supplied to a decoder (not shown) in the execution unit for decoding the microinstruction. The decoded result and the outputs of the mode register 305, the address register 306 and the editing register 309 are supplied to a branch condition logic (not shown). The branch condition logic calculates and sends the destination address to the microcode control storage 307. Accordingly, the pair of microinstruction start address 302a1 and the editing sub-word is read out from the decoding information storage 302 and is selected by the selector 304. The microinstruction start address from the selector 304 is sent to the microcode control storage 307 via the address register 306 and intermediate lines 3107 and 3109. Simultaneously, the editing control sub-word from the selector 304 is supplied to the editing circuit 303. The editing circuit 303 edits the operand 301b from the instruction register 301, and sends the result of the editing to the editing register 309. These operations are synchronized with the supplying of microinstructions from the microcode storage 307 to the microinstruction register 308.

When the next task must be run under a different mode, for example mode B, the modes must be changed. At the end of the mode A task a change mode operation code from the storage control unit 2 causes a unique microinstruction to be read into the microinstruction register 308 from the microcode storage 307. This unique microinstruction is recognized and the new four bits, representing mode B, are transferred to the mode register 305 over the line 3111. At least one portion of the microinstruction in the microinstruction register 308 is stored in the mode register 305 when the present job is finished. After that, the instruction to be run under mode B is read out from the main storage unit 1 to the instruction register 301 via the storage control unit 2. The subsequent operation is the same as previously described except the contents of the B-mode pair 302b1 and 302b2 are selected from the decoding information storage 302 by the selector 304 rather than the A-mode pair 302a1 and 302a2. Because of the ability to change the mode in the present invention, the desired program is able to run at the most suitable speed under any of a plurality of system architectures.

Furthermore, the change of the mode and the common use of the microprogram according to the present invention contribute to the decrease of microcode storage size.

I claim:

1. In a data processor having an execution unit controlled by microprograms, one of said microprograms being read from control storage means and applied to said execution unit for execution thereby in response to a corresponding instruction read from a storage unit, the improvement comprising:

information storage means for storing a plurality of words correlating said instructions to respective microprograms, at least some of said words containing a plurality of instruction codes indicative of respective equivalent functions in a plurality of different system architectures, said words being stored at locations in said information storage means addressed by operation codes of said instructions;

mode information storage means for storing system administrative information for designating one of said system architectures;

selector means for selecting and supplying to said control storage means one of said instruction codes from each word read from said information storage means in response to the system administration information from said mode information storage means.

2. In a data processor having an execution unit controlled by microprograms, one of said microprograms being applied to said execution unit for execution thereby in response to a corresponding instruction read from a storage unit, the improvement comprising:
control storage means for storing a plurality of microprograms, each of which comprises a series of microinstructions, at least one common said microprogram corresponding to an instruction code in a plurality of system architectures;
information storage means for storing at at least some locations therein a plurality of microinstruction start addresses of the microprograms in said control storage means, said start address for said common microprogram being stored at each of a plurality of locations in said information storage means, said locations being addressed by operation codes of said instructions;
mode information storage means for storing system administration information for designating one of a plurality of system architectures in response to a microinstruction given from said control storage means;
selector means for selecting one microinstruction start address among said a plurality of start microinstruction addresses from said information storage means in response to the system administration information from said mode information storage means; and
means for accessing said control storage means by the microinstruction start address from said selector means.

3. In a data processor having an execution unit controlled by microprograms, one of said microprograms being applied to said execution unit for execution thereby in response to a corresponding instruction read from a storage unit, each said instruction having an operation code and an operand, the improvement comprising:
information storage means for storing a plurality of editing format information words for controlling the editing of the operand in a first instruction according to the operation code of said first instruction;
mode information storage means for storing system administration information for designating one of a plurality of system architectures;
selector means for selecting one editing format information word from a plurality of editing format information words stored at an addressed location of said information storage means, in response to the system administration information from said mode information storage means; and
editing means for editing the operand of the instruction according to the editing format information word selected by said selecting means, the edited operand being applied to said execution unit.

4. In a data processor having an execution unit controlled by microprograms, one of said microprograms being applied to said execution unit for execution thereby in response to a corresponding instruction read from a storage unit, each said instruction having an operation code and an operand, the improvement comprising:
control storage means for storing a plurality of microprograms, each of which comprises one or more microinstructions, each of said microprograms corresponding to each instruction code in a plurality of levels of system architecture;
information storage means for storing a plurality of pairs of microinstruction start addresses and editing information sub-words, each of said editing information sub-words controlling the editing of a corresponding one of said operands, and each of said microinstruction start addresses designating a microinstruction start address of a microprogram corresponding to said pair, each pair being stored at a location designated by the operation code of the instruction, at least two pairs containing a common microinstruction start address;
mode information storage means for storing system administration information for designating one of a plurality of system architectures in response to a microinstruction given from said control storage means;
selector means for selecting a pair of the editing format information sub-words and the microinstruction start address from among a plurality of said pairs stored at at least some locations in said information storage means in response to the system administration information from said mode information storage means;
means for accessing said control storage means by the microinstruction start address from said selector means;
editing means for editing the operand of the instruction according to the designation of the editing format information word selected by said selecting means, the edited operand being applied to said execution unit.

* * * * *

UNITED STATES PATENT AND TRADEMARK OFFICE
CERTIFICATE OF CORRECTION

PATENT NO. : 4,691,278

DATED : September 1, 1987

INVENTOR(S) : Jun Iwata

It is certified that error appears in the above-identified patent and that said Letters Patent is hereby corrected as shown below:

Column 5, line 50, delete "$LD_{12}=AD_{12} \cdot MD,$"

Signed and Sealed this

Twentieth Day of September, 1988

*Attest:*

DONALD J. QUIGG

*Attesting Officer*    *Commissioner of Patents and Trademarks*